United States Patent [19]
Melin

[11] 3,750,901
[45] Aug. 7, 1973

[54] LOAD SQUARING APPARATUS

[76] Inventor: Thomas N. Melin, 1424 24th Ave., Longview, Wash. 98632

[22] Filed: Mar. 4, 1971

[21] Appl. No.: 121,041

Related U.S. Application Data

[60] Division of Ser. No. 704,196, Nov. 8, 1967, Pat. No. 3,596,776, which is a division of Ser. No. 609,973, Dec. 6, 1966, Pat. No. 3,376,985, which is a continuation-in-part of Ser. No. 401,594, Oct. 5, 1964, abandoned.

[52] U.S. Cl. .................................................. 214/6 S
[51] Int. Cl. ............................................ B65g 57/60
[58] Field of Search .................... 214/9, 620, 6 S, 214/730, 650–654

[56] References Cited
UNITED STATES PATENTS

| | | | |
|---|---|---|---|
| 2,940,613 | 6/1960 | Prentice et al. | 214/1 S |
| 2,834,384 | 5/1958 | Pearl | 214/6 S |
| 2,865,517 | 12/1958 | Alford | 214/653 X |
| 3,119,637 | 1/1964 | Eaves | 214/654 X |
| 1,878,994 | 9/1932 | Abbe | 214/652 |
| 3,027,031 | 3/1962 | Woodward et al. | 214/652 |
| 3,174,634 | 3/1965 | Peck | 214/652 |
| 3,262,595 | 7/1966 | Seip | 214/653 |
| 2,780,377 | 2/1957 | Glenn | 214/652 |
| 2,520,252 | 8/1950 | Mutchler | 214/652 X |

FOREIGN PATENTS OR APPLICATIONS
710,309    6/1954    Great Britain ..................... 214/654

Primary Examiner—Gerald M. Forlenza
Assistant Examiner—R. B. Johnson
Attorney—Christie, Parker & Hale

[57] ABSTRACT

The invention encompasses apparatus for rendering coplanar the end surfaces of all the pieces of timber in a stack of lumber by placing the stack in near vertical position while subjected to slight lateral constraints, and then dropping (or its equivalent) the stack end-wise to a foundation to produce a vertically effective impact upon the stack sufficient to cause the various timbers to move longitudinally relative to each other against the friction between the timbers, thereby to move the lower ends of all the timbers into a common plane. The stack is then returned to a horizontal position in such a manner that the timbers do not move longitudinally relative to each other.

5 Claims, 12 Drawing Figures

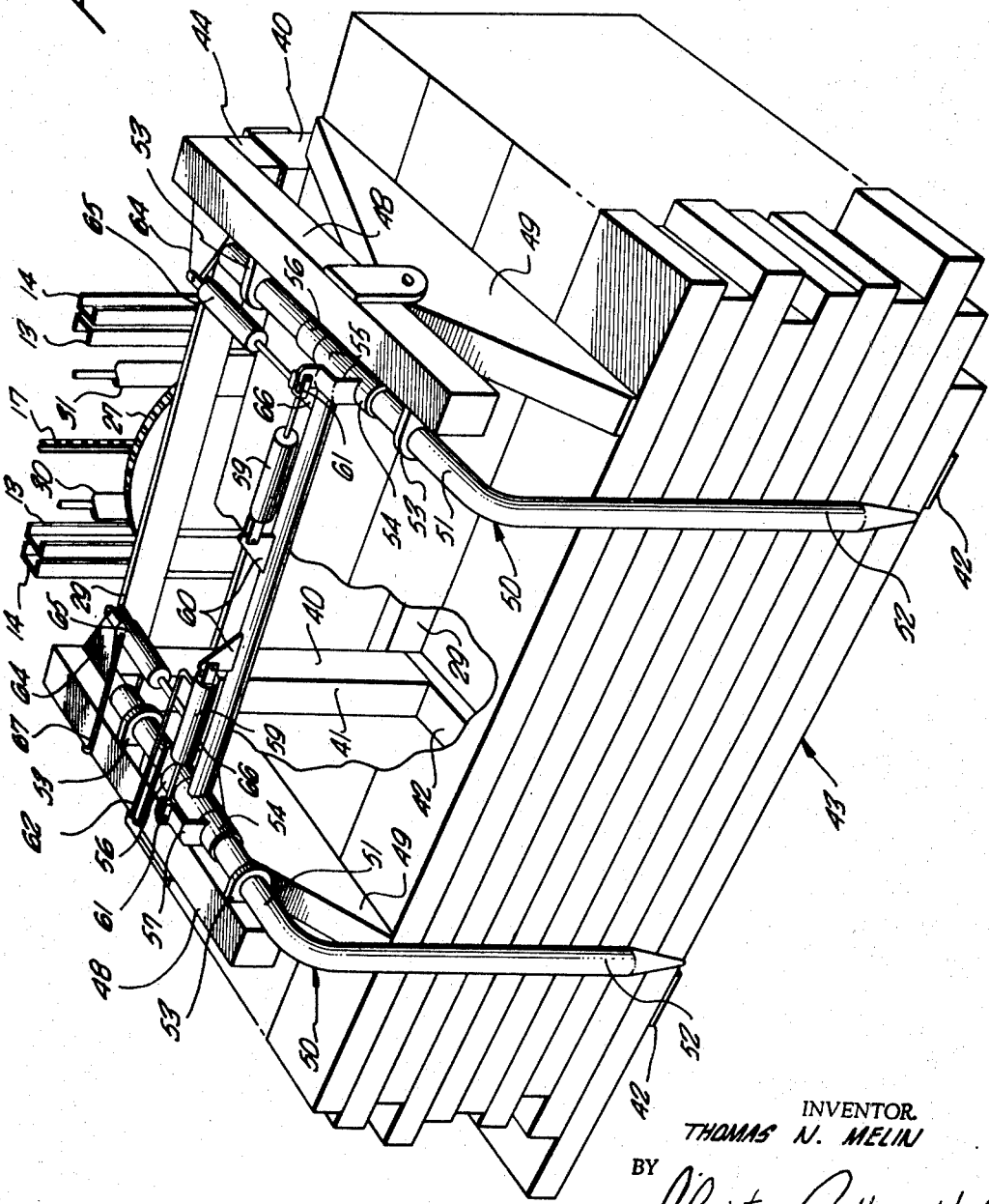

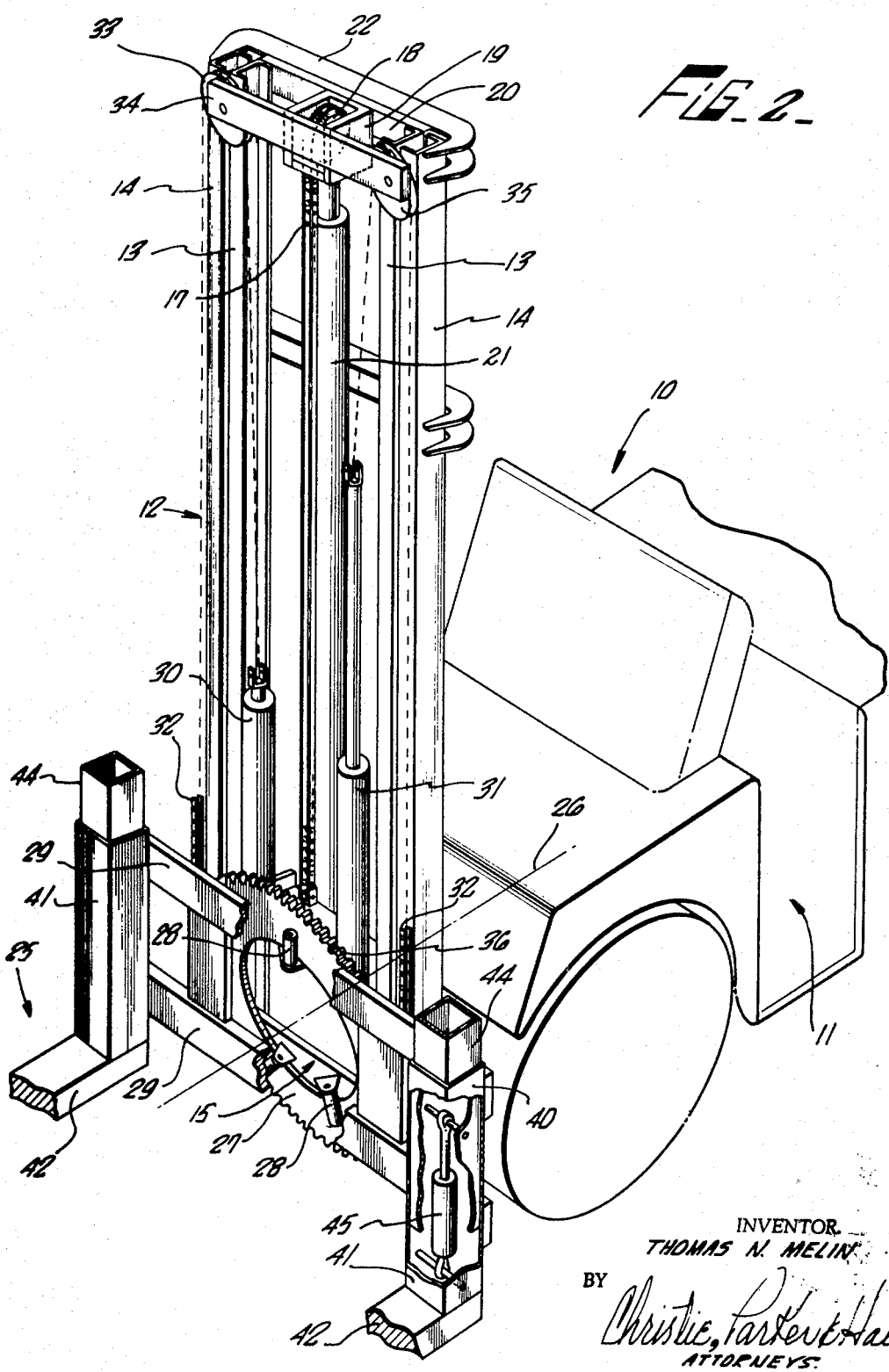

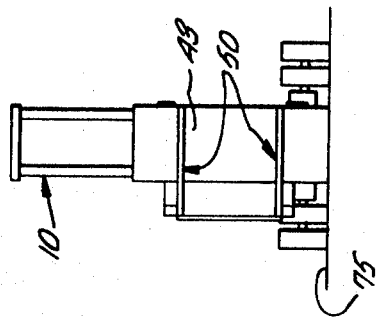
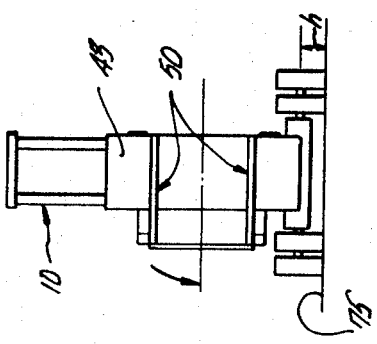
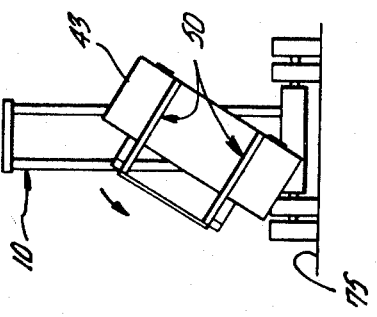
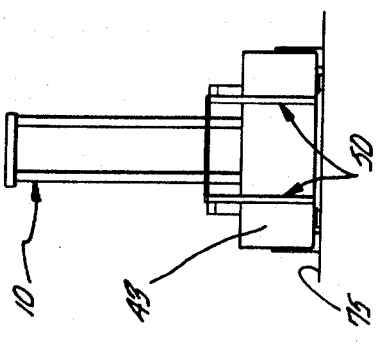
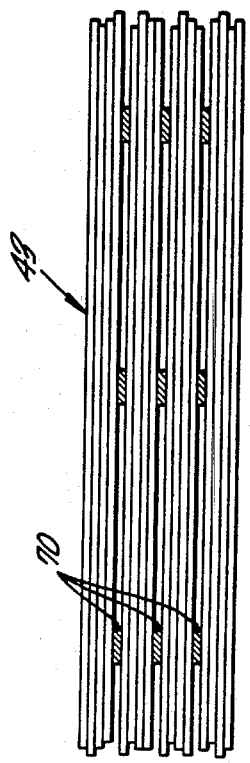

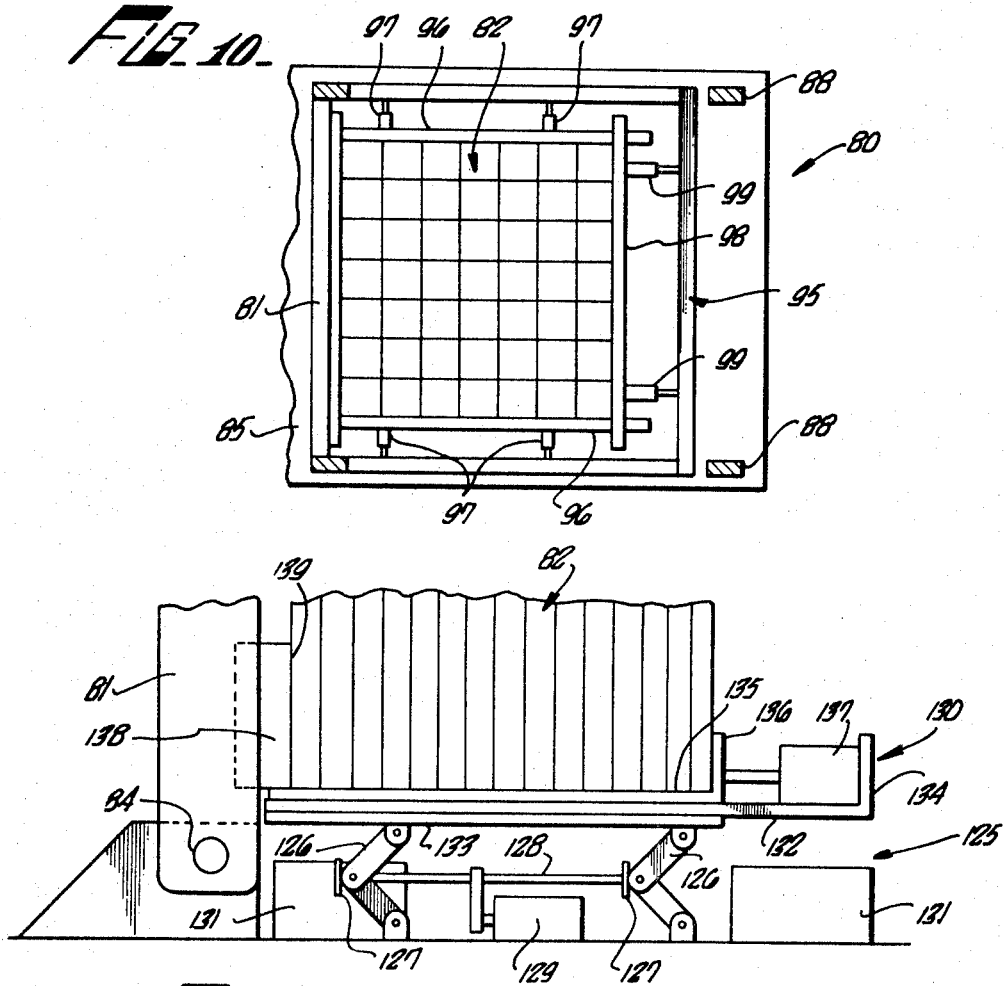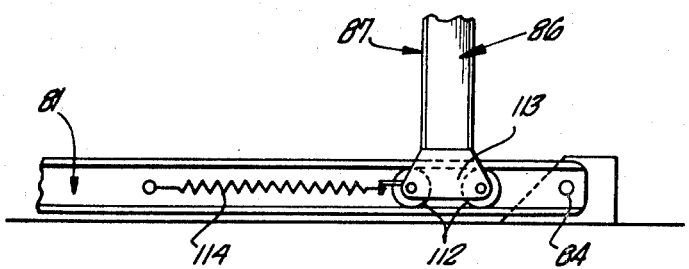

LOAD SQUARING APPARATUS

CROSS-REFERENCE TO RELATED APPLICATIONS

This application is a division of copending application Ser. No. 704,196, now U.S. Pat. No. 3,596,776 issued Aug. 31, 1971 filed Nov. 8, 1967 as a division of Ser. No. 609,973 filed Dec. 6, 1966, now U.S. Pat. No. 3,376,985 issued Apr. 9, 1968 which is a continuation-in-part of Ser. No. 401,594 filed Oct. 5, 1964, now abandoned.

This invention relates to load squaring and, more particularly, to apparatus for squaring a stack of lumber or the like.

After lumber has been cut in a sawmill, the timbers are arranged into stacks so that the green lumber may be dried prior to being sold. The stacks should have square ends to facilitate warehousing and color coding of lumber, for example. Usually the lumber is stacked by hand. If the stack is very carefully made up so that the stack is square along the sides and across the ends, the stacking procedure takes an unprofitably long time to accomplish.

Hydraulic rams have been provided to square a roughly composed stack of lumber by driving the stack lengthwise against a squaring plate. The resistance of green lumber to motion during this type of squaring is extremely high. Accordingly, a ram for carrying out the described squaring process must have an extraordinary high tonnage. Also, hydraulic squaring devices often destroy the timbers they operate upon since it is rare that all the timbers in a stack will be of the same length. Accordingly, very often the longer timbers in a stack will be shattered by the compressive forces applied to the timbers while the stack is being end-sqaured by such devices.

After the stack has been squared in a ram device, it must be transported to another area of the mill where it placed with other squared stacks for drying. This transportation may be done by industrial fork-lift trucks.

This invention provides novel method and apparatus for squaring a stack of lumber or the like. One described embodiment of the apparatus is an attachment unit for an industrial fork-lift truck; the same truck which is used to transport the lumber may be used to square the stack. A fork-lift truck equipped with such apparatus is not a single purpose vehicle, since a portion of the apparatus may remain unused to provide a fork-lift truck of more conventional configuration. Another described embodiment of the invention is suited for use as a permanent piece of equipment in a sawmill and the like. Gravity is relied upon to end-square the stack with the result that no timbers in the stack can be shattered.

In terms of method, the invention provides a procedure for end-squaring a stack of lumber and the like. A stack to be end-squared is positioned in a substantially vertical orientation over and adjacent an aligning surface. The method includes the step of forcibly engaging the lower end of a positioned stack with the aligning surface, this step being performed in a manner which produces upon the stack an upwardly effective impact having a magnitude sufficient to cause the lower ends of all the timbers in the stack to engage the aligning surface. At the time the forcibly engaging step is performed, any lateral constraints upon the load are essentially relaxed, thereby minimizing friction between the timbers in the stack and reducing the magnitude of the impact required to a level which does not damage the timbers.

In terms of apparatus, the invention provides means for receiving a stack of lumber and the like to be end-squared. Means are provided for moving the stack receiving means to place a received stack in a substantially vertical orientation with one end of the stack downward. The structure also includes aligning surface means disposed adjacent the one end of the stack. Also, the invention includes gravitationally augmented means for engaging the aligning surface with the lower end of the positioned stack for producing a vertically effective impact upon the stack, the impact having a magnitude sufficient to cause the lower ends of the timbers in the stack to engage the aligning surface means and be aligned in a common plane.

The above-mentioned and other features of the invention are more fully set forth in the following detailed description of the invention taken in conjunction with the accompanying drawings wherein:

FIG. 1 is a perspective view, with parts broken away, of a portion of apparatus according to this invention, the apparatus being shown in conjunction with a stack of lumber to be squared;

FIG. 2 is a perspective view, with parts broken away, of further apparatus according to this invention;

FIG. 3 is a front elevation view of a fork-lift truck in accord with this invention shown in the first stages of the process of squaring a load of lumber;

FIG. 4 is a front elevation view, similar to FIG. 3, showing a second stage of the process for squaring the stack of lumber;

FIG. 5 shows the fork-lift truck and the stack at a third stage of the squaring procedure;

FIG. 6 shows the fork-lift truck and the stack at about the end of the load squaring procedure;

FIG. 7 is a side elevation view of a stack of lumber to be squared by the apparatus shown in FIGS. 1 and 2;

FIG. 10 is a section view taken along line 10—10 of FIG. 8;

FIG. 11 is an enlarged fragmentary elevation view of another portion of the structure shown in FIG. 8; and FIG. 12 is a side elevation view of another device similar to the device shown in FIG. 8.

Figure 8:
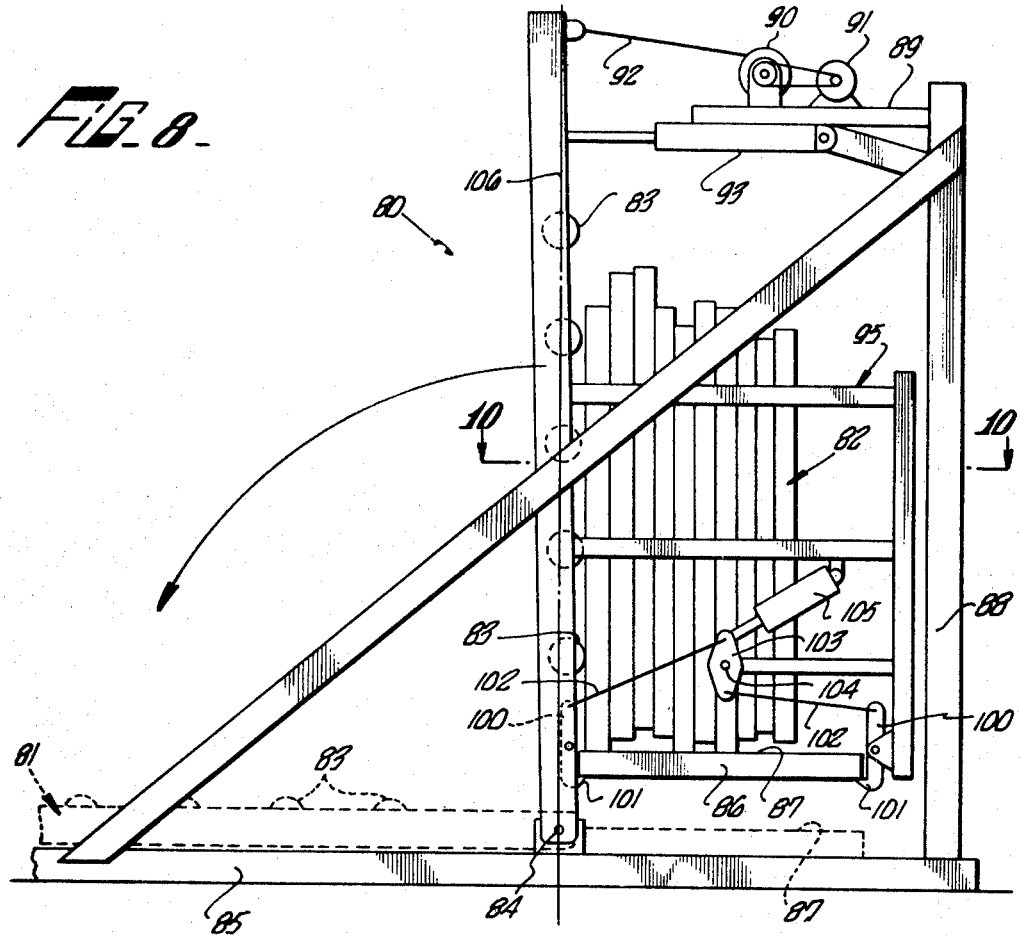
FIG. 8 is a side elevation view of another device according to this invention.

Referring initially to FIG. 2, an industrial fork-lift truck 10 is shown to include a steerable chassis 11 to the front end of which is mounted a vertically extending elevator 12. The elevator includes track means composed of two pairs 13 and 14 of structural channels which are disposed in a common plane and which open toward each other. Channels 14 are connected at their lower ends to the truck chassis. Channels 13 are mounted by a plurality of wheels (not shown) to channels 14 for guided movement vertically along channels 14.

An elevator carriage 15 is disposed between channels 13 and carries a plurality of rotatable wheels adapted to ride and be guided between the flanges of channels 13. A link chain 17 is connected at one end to the upper end of the carriage. The chain extends over a pully 18 disposed adjacent the upper ends of channels 13 and rotatably mounted in a bracket 19. Bracket 19 is secured to a cross member 20 which extends between the upper ends of channels 13. Bracket 19 is also secured to the upper end of an extensible hydraulic ram 21, the lower end of which is connected to the chassis of the lift truck. The end of chain 17 opposite from carriage 15 is secured relative to the truck chassis. As ram 21 is extended to raise channels 13 in channels 14, carriage 15 rises along channels 13 at double the rate of the extension of the ram.

A fork apron assembly 25 (FIGS. 1 and 2) is carried by carriage 15 and is mounted to the carriage for rotation about an axis 26 extending longitudinally of truck 10. As shown in FIG. 2, the means for rotatably mounting the fork apron assembly to the carriage includes an annular disc plate 27. A plurality of roller bearings 28 are mounted to the carriage and engage the disc plate so the disc plate is rotatably mounted to the carriage. The fork apron assembly includes a pair of cross members 29 which are secured to the forward side of the disc plate in a manner which permits the disc plate to move angularly about axis 26 without interfering with bearings 28.

Fork-lift truck 10 also includes selectively operable means for rotating the fork apron assembly about axis 26. As shown in FIG. 2, a pair of double-acting extensible hydraulic rams 30 and 31 are mounted to the upper side of carriage 15 and extend upwardly therefrom between channels 13. A length of chain 32 is connected to the upper end of ram 30 and extends around a pulley 33 which is rotatably mounted to a cross bracket 34. The cross bracket is secured to bracket 19 and to channels 13. Chain 32 extends downwardly from pulley 33 and around the lower periphery of disc plate 27 and then upwardly to a second pulley 35 which is rotatably mounted to the end of cross bracket 34 opposite from pulley 33. Chain 32 extends downwardly from pulley 35 to its other end which is secured to the upper end of ram 31. Rams 30 and 31 are cross-connected and are arranged so that when ram 30 is retracted, ram 31 is extended, as shown in FIG. 2. The periphery of disc plate 27 defines a chain sprocket as shown at 36 in FIG. 2. Accordingly, as rams 30 and 31 are operated to move chain 32, disc plate 27 is indexed a corresponding amount angularly of axis 26. Rams 30 and 31 are extensible to such an extent that the disc plate is rotatable through an arc of at least 90°, and may be rotated through an arc of 180° if desired.

As shown most clearly in FIG. 2, a pair of rectangularly cross-sectioned, hollow columns 40 are secured to the opposite ends of fork apron assembly cross members 29. Preferably, columns 40 are disposed equidistantly on opposite sides of axis 26 and are arranged parallel to one another. Columns 40 have front surfaces 41 spaced opposite from the vehicle which are coplanar with one another and define an abutment plane in the fork apron assembly. An elongated fork member 42 is secured to the lower end of each of columns 40 and extends away from the vehicle parallel to axis 26. The forks have preferably coplanar upper surfaces upon which a load, such as a stack 43 of lumber, as shown in FIG. 1, may be disposed. A hollow rectangularly configured column 44 is disposed in each of columns 40 and is adapted for telescoping movement within its enclosing column.

As shown in FIG. 2, a double-acting hydraulic ram 45 is disposed internally of each column 44 and has its lower end pivotally connected to column 40 and its upper end connected to column 44. Rams 45 are operable to cause telescoping movement of columns 44 within columns 40. Suitable hydraulic lines (not shown) are connected to rams 45. Preferably the rams are operated in tandem, although, if desired, they may be operated independently of each other.

A clamp arm 48 is connected to the upper end of each of columns 44 and, as shown in FIG. 1, extends away from the vehicle chassis. Preferably, the clamp arms are parallel to each other and to the fork members. A clamp shoe 49 is pivotally connected to each of the clamp arms and depends therefrom. The clamp shoes are adapted to engage the upper side of lumber stack 43 as the clamp arms are moved toward fork members 42 by operation of rams 45. FIG. 1 shows the clamp shoes engaged with stack 43 to securely clamp the stack between the shoes and the fork members so that the individual timbers in the stack cannot move relative to one another if the stack is turned to dispose the timbers perpendicular to the surface upon which truck 10 is supported.

A load securing arm 50 is movably connected to each of clamp arms 48 as shown in FIG. 1. Each securing arm preferably is fabricated from an elongated tubular member which is bent at substantially right angles to define first and second legs 51 and 52. Leg 51 of each securing arm is mounted to a corresponding clamp arm so that the leg is slidable and rotatable relative to the clamp arm. A pair of brackets 53 extend from each clamp arm toward the other clamp arm; leg 51 of the associated securing arm is rotatably and slidably journalled in these brackets.

Fork apron assembly 25 includes means for moving the securing arms toward and away from the truck and for rotating the securing arms, i.e., legs 52 of the securing arms, in a plane disposed normal to the fork members. As shown in FIG. 1, three sleeves 54, 55, and 56 are disposed circumferentially of each securing arm leg 51 between brackets 53. Sleeves 54 and 56 are secured to the respective leg to be secured from angular and axial movement relative to the leg; sleeve 55 is rotatable relative to the leg, but is constrained by sleeves 54 and 56 from movement axially of the leg.

A lever arm 57 extends upwardly, rearwardly, and then upwardly from sleeve 54 so that its end opposite from the sleeve is disposed vertically over sleeve 55. A cross member 58 extends transversely of the fork apron assembly between the clamping arms and is connected at each of its opposite ends to a respective one of sleeves 55. A pair of double-acting extensible hydraulic ram assemblies 59 are connected between cross member 58 and respective ones of lever arms 57. As shown in FIG. 1, each ram assembly 59 has one end pivotally connected to a lug 60 which extends upwardly from a central portion of the cross member. The opposite end of the ram assembly is pivotally connected to a respective one of lever arms 57 by a yoke 61. Suitable hydraulic lines 62, only some of which are shown, are connected from each of ram assemblies 59 to suitable control means mounted on truck chassis 11 so as to be accessible to the driver of the truck. Ram assemblies 59 are operable to move the securing arms angularly about the axis of legs 51 so that securing arm legs 52 are movable between a position in which each leg 52 extends horizontally from its clamping arm toward the other clamping arm, and a position in which the legs extend vertically toward the adjacent fork member. As indicated above, legs 52 of the securing arms move between these two positions in a plane which is normal to axis 26 and to the elongate extents of the fork members.

A lug 64 is extended from the rear end of each clamping arm 48 toward the other clamping arm. Preferably each lug 64 lies parallel to and in the plane of fork apron assembly cross member 58 and securing arm legs 51. A double-acting hydraulic ram assembly 65 is connected between each lug 64 and a lug 66 which extends rearwardly from cross member 58 adjacent a respective sleeve 55. The ram assemblies are disposed so that the lines along which they are extensible are disposed parallel to the elongate extents of securing arm legs 51. Ram assemblies 65 are operable to move the securing arms toward and away from the fork apron, the fork apron being comprised of columns 40 and cross members 29, along the elongate extents of securing arm legs 51. Accordingly, upon operation of rams 65, the securing arms and cross member 58 move relative to the clamping arms and brackets 53. Suitable hydraulic lines 67, the majority of which have been deleted from FIG. 1 for the purposes of clarity of illustration, extend from the ram assymblies to the hydraulic control unit disposed adjacent the driver's seat.

FIG. 1 shows stack of lumber 43 disposed in fork apron assembly 25. After the stack has been formed in a rough manner, the fork-lift truck is driven up to the stack and the forks are inserted beneath the stack. At this time the clamp arms are disposed relatively far apart from the forks and the securing arms are disposed so that legs 52 thereof are horizontal. After the stack has been lifted by the forks by extension of ram 21, the securing arms are indexed angularly into their positions in which they extend vertically from the clamp arms toward the fork members. Rams 65 are then actuated to move the securing arms toward elevator 12. If any of the timbers in stack 43 were not originally in parallel relation to one another, such operation of the securing arms helps move the timbers into parallel alignment and helps square the vertical sides of the stack. This squaring procedure occurs as the stack is moved along the fork members into engagement with the abutment plane defined by surfaces 41 of columns 40. Preferably, the rearward surfaces, i.e., the surfaces disposed toward columns 40, of the securing arm legs 52 define a plane which is parallel to the abutment plane. It is apparent from the foregoing that the securing arms function as aligning means in the fork apron assembly and as a safety mechanism when the load is dropped.

Rams 45 are then operated to move the clamp arms toward the fork members and to move the clamp shoes into engagement with the upper surface of stack 43. As described above, the clamping force which exists between the clamp shoes and the fork members is sufficient to prevent the timbers in the stack from moving relative to one another when the stack is positioned so that the timbers are vertical. For green lumber this clamping force is approximately 60 percent of the weight of the stack. For example, a 4 × 4 × 24 feet stack of lumber weighs approximately 15,000 lbs. The clamping force applied to such a stack is on the order of 9,000 lbs.

FIG. 7 is an elevation view of lumber stack 43 in which the ends of timers are staggered relative to one another. As shown, a plurality of stickers or spacers 70, i.e., short transverse slats, separate about every fourth layer of lumber in the stack from the layer next above. The stickers are provided to assure proper circulation of air through the stack as the stack is dried.

FIGS. 3, 4, 5, and 6 show various stages in the process of end-squaring a stack of lumber through use of the above-described apparatus. FIG. 3 shows the stack supported in fork-lift truck 10 at the completion of the process described above. After the vertical sides of the load have been squared and the stack has been clamped with the proper amount of force between the fork members and the clamp arms, ram 21 is actuated to raise the load. Thereafter, as shown in FIG. 4, rams 30 and 31 are operated to index the fork apron assembly angularly of axis 26 through an arc of 90°. If desired, rotation of the fork apron assembly may occur simultaneously with operation of ram 21.

As shown in FIG. 5, the stack having the timbers thereof arranged vertically of a planar surface 75 upon which the fork-lift truck is supported is positioned so that the lower ends of the timbers (on the average) are positioned a distance $h$ above the surface. Surface 75 functions as an aligning surface. The clamping engagement of the fork apron assembly with the stack is then momentarily released and then is quickly reestablished. The clamping engagement is released by moving the clamp arms about 1 inch away from the fork members. Also, securing arms 52 are moved slightly away from the truck chassis. During the period in which the clamping engagement of the fork apron assembly with the stack is released, the individual timbers in the stack fall by their own weight to surface 75. The timbers may move relative to one another during this period. As the stack strikes the aligning surface, the lower ends of the timbers are arranged in a common plane. Accordingly, when the clamping engagement of the fork apron assembly with the stack is reestablished, the stack has been end-squared. Because the timbers in the stack are vertically oriented when the clamping and securing members are reengaged with the stack, very little force is required to square the vertical faces of the up-ended stack.

Distance $h$ must not be too great or else the timbers in the impacted stack may be shattered. At the least, stickers 70 will all fall to the squared end of the stack if the stack is dropped from too great a height. Also, the stack must be dropped from a height sufficient to assure that each timber has sufficient momentum at the instant of impact with surface 75 to move relative to the other timbers against the inter-timber friction present in the stack; the effects of such friction are minimized by essentially relaxing all lateral constraints upon the up-ended stack at the time the stack is dropped. If this is not the case, the timbers will be maintained in their original position by the friction which exists between adjacent timbers. It is preferred that distance $h$ be between 3 and 12 inches, depending upon the sizes of the timbers in the stack and the surface finishes of the timbers.

The stack cannot be unclamped for too long a period, or else the stickers will all fall to the lower end of the stack and the stack itself may begin to fall apart. Accordingly, the clamp arms are moved back toward the fork members about ¼ to 1 second after they were first moved away from the fork members. Moreover, the clamp arms should not be moved too far apart to release the stack. If the stack is too loose when dropped, the stickers will be overly displaced within the stack. Also, if the stack is too tight when dropped because of insufficient movement of the clamp arms away from the fork members, the timbers may not move sufficiently to end-square the load.

It is preferred that the securing arms be disposed so that legs 52 extend between the clamping arms and the fork members during the process illustrated in FIGS. 3 to 6.

After the load has been end-squared by the above-described procedure, the stack is returned to a horizontal position. The fork-lift truck may then be operated in a conventional manner to transport the stack to the area wheere drying will occur.

The structure described above is but one form which apparatus according to this invention may assume; another form of the invention is illustrated in FIGS. 8–12 and is described below. The structure shown in FIGS. 1 and 2 may be provided as an attachment unit for an existing fork-lift truck or as a separate mechanism for use independently of a fork truck. It is required only that the fork apron assembly be rotatably mounted to the elevator of the truck. Since the trucks to which the fork apron assembly may be mounted may vary in design, it is apparent that the mechanism for mounting the fork apron assembly to the truck, and for rotating the fork apron assembly relative to the truck, will vary from truck to truck. Accordingly, the mechanism shown and described for accomplishing these functions is shown for the purposes merely of example and completeness of disclosure.

Moreover, the fork apron assembly may be partially dismantled to provide a conventional fork-lift truck. To accomplish this, it is necessary only to disconnect rams 45 from columns 40 and lift the rams, columns 44 and the clamp arms from columns 40. The result is a highly useful vehicle in which a load carried on the forks may be tilted by operation of the mechanism provided for rotating the fork apron assembly.

The structure described above comprises basic structural components of the invention. The forks, clamp arms 48 and shoes 49 comprise means for receiving a stack of lumber to be end-squared. Rams 30 and 31, chain 32, and sprocket 36, together with rollers 28, define means for moving the stack receiving means to place a received stack in a substantially vertical orientation with one end of the stack disposed downward. Surface 75 comprises an aligning surface disposed adjacent the vertically oriented stack. Ram 21, the clamp arms, the securing members and the hydraulic system of the apparatus cooperate to define gravitationally augmented means for engaging the aligning surface with the lower end of the stack for producing a vertically effective impact upon the stack of a magnitude sufficient to cause the lower ends of the timbers in the stack to engage the aligning surface.

Figure 9:
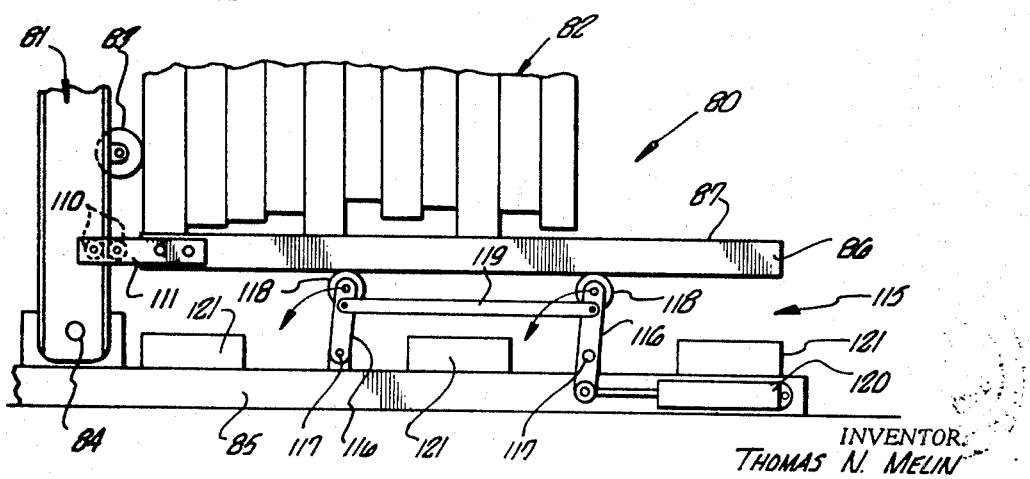
FIG. 9 is an enlarged elevation view of a portion of the structure shown in FIG. 8.

Another end-squaring device 80, shown in FIGS. 8–11, includes an elongate, essentially rigid frame 81 upon which a stack of lumber 82 to be end-squared is placed so that the stack is aligned with the length of the frame. The frame rotatably mounts a plurality of spaced rollers 83 arranged transversely of the length of the frame. The rollers are of equal diameter and have their axes of rotation arranged in a common plane. The frame is pivoted, as at 84, at one end thereof to a foundation 85 for movement from a horizontal position (shown in dashed lines in FIG. 8) to a substantially vertical position (shown in solid lines in FIG. 8) relative to the foundation. When the frame is in a horizontal position, a stack 82 can be rolled lengthwise along the frame on rollers 83 into and out of the end-squaring device toward and away from an aligning table 86 carried by the frame adjacent pivot 84. As shown in FIGS. 8 and 9, the aligning table has a flat aligning surface 87 disposed essentially normal to the length of the frame and facing the unpivoted end of the frame.

The frame is provided in connection with a mechanism for moving the table about its pivoted connection to the foundation between its horizontal and essentially vertical positions. Preferably this mechanism includes a fixed framework comprised of a pair of columns 88 connected to the foundation in spaced relation to the frame pivot. An elevated platform 89 is mounted between the columns over the space between the columns and the frame pivot. A reversible winch 90 is located on the platform as is a suitable drive motor 91 for the winch. The winch carries a pair of cables 92 (only one of which is shown) which are connected to opposite sides of frame 81 at locations spaced along the frame from pivot 84.

A pair of extensible bumper ram assemblies 93 (only one of which is shown) are also mounted to the platform and extend substantially horizontally from the platform toward the positions which the side rails of the frame occupy when the frame is essentially vertical. The bumper ram assemblies are constructed to act as dashpots when loaded in a manner urging the assemblies to shorten. Also, the bumper ram assemblies are constructed so that they can be powered to extend in length.

The frame moving mechanism described is but one type of mechanism which can be used in tyhe structure of apparatus according to this invention. If desired, a purely hydraulic mechanism could be used in lieu of the winch-oriented mechanism described.

A cage-like framework 95, shown best in FIGS. 8 and 10, is mounted to frame 81 so that stack 82 is located within an d surrounded by the framework when the end-squaring device is loaded. A plurality of restraining bars 96 are mounted to framework 95 at spaced locations along frame 81, each restraining bar being supported from the framework by a pair of pneumatic rams 97 of relatively small capacity. Bars 96 are arranged to engage the sides of stack 82. Similar restraining bars 98 are mounted to the framework by small capacity pneumatic rams 99 for engaging the top of the stack. The restrainer bars are provided to prevent the timbers in stack 82 from moving undesirably as the stack is moved to and from a substantially vertical position relative to foundation 85.

Device 80 also includes means, effective when a stack to be end-squared is positioned vertically over the aligning surface, for engaging the aligning surface with the lower end of the stack to produce upon the stack a vertically effective impact having a magnitude sufficient to cause the lower ends of the timbers in the stack to move into engagement with the aligning surface. This mechanism, at least in part, relies upon gravity to produce the desired impact.

As shown in FIG. 8, aligning table 86 cooperates adjacent each of its corners with a dog 100. Two of the dogs are pivoted to frame 81 and the other two are pivoted to framework 95. Each dog has a hook-like ledge portion 101 adapted to enage the underside (referring to the vertical position of the frame) of the aligning table. The dogs at each side of the aligning table are connected by links 102 to the opposite ends of a bellcrank 103 pivoted at 104 to framework 95. The bellcrank is also connected to a telescoping ram 105 carried by the framework. When the frame is disposed horizontally prior to an end-squaring operation, the aligning table is located a short distance along the frame from frame pivot 84 and the dogs are positioned to engage the side of the table toward this pivot, thereby preventing the table from moving toward the pivot.

To end-square a load of lumber, the load is placed on frame 81 so that the end of the load to be squared abuts surface 87 of the aligning table; at this time the restraining bars carriead by framework 95 are retracted toward the framework to permit free entry of the load along the frame into the framework. After the load has been properly positioned on the frame, rams 97 and 99 are operated to cause the restraining bars to relatively lightly engage the sides and top of the load, i.e., stack 82. Winch 90 is then operated to move the frame about pivot 84 into a vertical or substantially vertical position; preferably the frame is moved so that it is 2° or 3° short of a truly vertical attitude, as illustrated in FIG. 8 relative to plumb line 106 through pivot 84.

As the frame and the load are moved about pivot 84, the center of gravity of this combination passes plumb line 106; the bumper ram assemblies are arranged to engage the frame before this occurs. Accordingly, the frame is prevented by the bumper ram assemblies from swinging sharply into its vertical position. Instead, the winch draws the frame into position against the cushioning effect provided by the bumper ram assemblies funtioning as dashpots.

When the stack is properly positioned in a vertical attitude, rams 105 are operated to move dogs 100 so that the aligning table is released by the dogs and falls a selected distance to the foundation. This operation occurs just after or as rams 97 and 99 are retracted slightly to remove essentially all lateral constraints from the stack. As a result, when the table falls, the stack is free to fall in a condition in which friction between individual timbers in the stack is at a minimum.

The amount of table falls to the foundation is selected to produce the impact described above. As a result, all the timbers in the stack move into contact with the table aligning surface and the load is end-squared. Rams 97 and 99 are then operated to engage the restraining bars with the load just after the table falls. Thus, lateral displacement of the timbers in the stack is minimized. Rams 97 and 99 are operated with sufficient force that the end-squared stack is prevented from moving relative to the frame as the frame is returned to a horizontal position. Alternatively, the table can be held relative to the frame, as by a mechanical lock between the table and the frame, as the frame is returned to a horizontal position.

To return the frame to a horizontal position after stack 82 has been end-squared, bumper ram assemblies 93 are operated to cause the assemblies to extend, thereby driving the center of gravity of the frame and stack over center of plumb line 106. The bumper ram assemblies are extended against a drag provided by winch 90 so that, after the rams are fully extended, further descent of the frame is controlled by paying out cables 92 from the winch. After the frame is returned to its horizontal position, the squared stack is removed from the device and the next stack of lumber to be squared is placed in the device.

FIGS. 9, 11 and 12 illustrate details of device 80, such details not being shown in FIG. 8 for the purposes of clarity of illustration. As shown in FIG. 9, table 86 preferably is guided relative to frame 81 as it falls during the end-squaring operation proper by rollers 110 engaged on opposite sides of the flange of the channel from which the sides of the frame preferably are made. The rollers are mounted to brackets 111 secured to the sides of the aligning table. Alternatively, as shown in FIG. 11, the table may be guided by rollers 112 riding between the flanges of the frame side channels and supported on brackets 113. To facilitate thpe return of the table to the position it occupies relative to the frame prior to the instant the table is dropped, a spring 114 is connected between each side of the frame and brackets 113; the springs are effective to move the table to the desired position as a squared load is removed from the frame.

FIG. 9 illustrates an alternate mechanism 115 for releasing table 86 relative to frame 81. This mechanism includes levers 116 pivoted at 117 to the foundation at their lower ends and carrying rollers 118 at the upper ends for engaging the underside of the aligning table. The levers are pivotally interconnected by a link 119. The levers are connected to a ram 120 for operation of the levers in tandem by the ram. When the table is in position prior to being released for producing the desired impact upon a stack to be end-squared, levers 116 are substantially vertical and space the table a selected distance above stop blocks 121 secured to the foundation below the table. The table is dropped by operating the ram to cause the levers to move into unstable positions relative to the table, after which the table falls to the stop blocks and drives the levers into the spaces provided for them between the stop blocks.

FIG. 12 illustrates another mechanism 125 for producing the desired impact upon the stack to be end-squared, which mechanism includes inherently unstable linkages 126 secured from displacement by keeper pads 127 connected to an actuating ram 128 by a connector rod 129. When it is desired to produce the desired impact, the ram is operated to free the keeper pads from the linkages, thereby allowing the linkages to move substantially instantaneously from a relation in which they support an aligning table 130 a selected distance above stop blocks 131 into a relation in which the table is supported on the stop blocks.

Particularly where the timbers in the stack being end-squared are of low weight per unit length, there is a tendency for the timbers to bounce and "walk" apart at their lower ends after the end-squaring impact. Aligning table 130, shown in FIG. 12, incorporates a mechanism for correcting for such action of the timbers. The table includes a base 132, adapted to be received on a support plate 133 to which linkages 126 are connected, having an upstanding flange 134 along its edge opposite from frame 81. A pusher plate 135 is slidably mounted on the base, and its upper surface defines the flat aligning surface of the table. The base is wider in a direction away from the frame than the support plate. An upstanding flange 136 is connected to the pusher plate along the edge thereof adjacent flange 134. An extensible ram 137, arranged normal to the length of the frame, is connected between flanges 134 and 136.

At the time the table is dropped to produce the desired impact upon stack 82, the ram is operated so that flange 136 is relatively close to flange 134. After the impact and after the timbers have settled following any bounce of the timbers, the ram is operated to slide the support plate under the stack toward the frame and to cause flange 136 to engage the adjacent timbers. Continued operation of the ram, preferably while the stack is vertical, drives the lower ends of the timbers toward an abutment member 138 secured to the frame and having an abutment surface 139 coplanar with the extremities of rollers 83. Thus the timbers are rearranged into an orderly fashion in the stack. If desired, a secondary pusher plate may be provided in the table for movement at right angles to the movement of plate 135 toward and away from a cooperating abutment plate secured to framework 95.

It will be appreciated that the features shown in FIGS. 9, 11 and 12 can be incorporated into the structure shown in FIGS. 8 and 10 without departing from the scope of the invention; these features are shown separately from FIGS. 8 and 10 for the sake of clarity of the drawings.

What is claimed is:

1. Apparatus for end-squaring a stack of lumber comprising:
   a. means for receiving a stack of lumber to have one end thereof squared and for engaging the stack circumferentially of the length thereof, said means including a foundation and an elongate frame pivoted at one end thereof to the foundation,
   b. aligning table means cooperating with the frame adjacent the pivoted end thereof and defining an aligning surface,
   c. reversible power means coupled to the frame operable for moving the frame, and a stack received thereon, relative to the foundation about the pivot between a substantially horizontal position of the frame and the received stack and a position wherein the frame extends substantially vertically of the pivot and the received stack is substantially vertically oriented with the one end thereof downward and supported on the aligning table means,
   d. means selectively operable reversible engageable with the frame along the length thereof from the pivot as and after the frame nears its substantially vertical position and the center of gravity of the frame and the received stack nears vertical alignment with the pivot for resisting movement of the frame to its substantially vertical position and for driving the frame through at least an initial portion of movement of the frame from its substantially vertical position to its substantially horizontal position, and
   e. gravitationally augmented means for engaging the aligning surface with said one end of a vertically oriented received stack for producing a vertically effective impact upon the stack of a magnitude sufficient to cause the lower ends of all the components of the stack to engage the aligning surface.

2. Apparatus according to claim 1 wherein the aligning table means is carried by the frame for movement with the frame about the pivot.

3. Apparatus according to claim 1 wherein the aligning table means is carried by the foundation separate from the frame adjacent to the pivot for registry with the one end of a received stack when vertically oriented.

4. Apparatus according to claim 3 including means for moving the aligning surface of the aligning table laterally of the extent thereof.

5. Apparatus for end-squaring a stack of lumber comprising:
   a. means for receiving a stack of lumber to have one end thereof squared and for engaging the stack circumferentially of the length thereof, said means including a foundation, an elongate frame pivoted at one end thereof to the foundation, and aligning table means cooperating with the frame adjacent the pivoted end thereof and defining an aligning surface,
   b. means for moving the stack receiving means to place a received stack in a substantially vertical orientation with the one end thereof downward, adjacent the aligning surface of the aligning table means, the means for moving the stack receiving means including means connected to the frame operable for moving the frame relative to the foundation about the pivot between a substantially horizontal position of the frame and a position wherein the frame extends substantially vertically of the pivot, a received stack being supported on the aligning table means in the latter position of the frame, reversible winch means disposed at an elevated location adjacent the frame pivot, cables connected between the winch means and the frame remote from the pivot, and means adjacent the winch means engageable with the frame as and after the frame nears its substantially vertical position and the center of gravity of the frame and a received load nears vertical alignment with the pivot for resisting movement of the frame to its substantially vertical position and for driving the frame through at least an initial portion of movement of the frame from its substantially vertical position to its substantially horizontal position, and
   c. gravitationally augmented means for engaging the aligning surface with said one end of a vertically oriented received stack for producing a vertically effective impact upon the stack of a magnitude sufficient to cause the lower ends of all the components of the stack to engage the aligning surface.

* * * * *